No. 791,070. PATENTED MAY 30, 1905.
I. S. BARNETT.
FRICTION CLUTCH.
APPLICATION FILED FEB. 18, 1904.
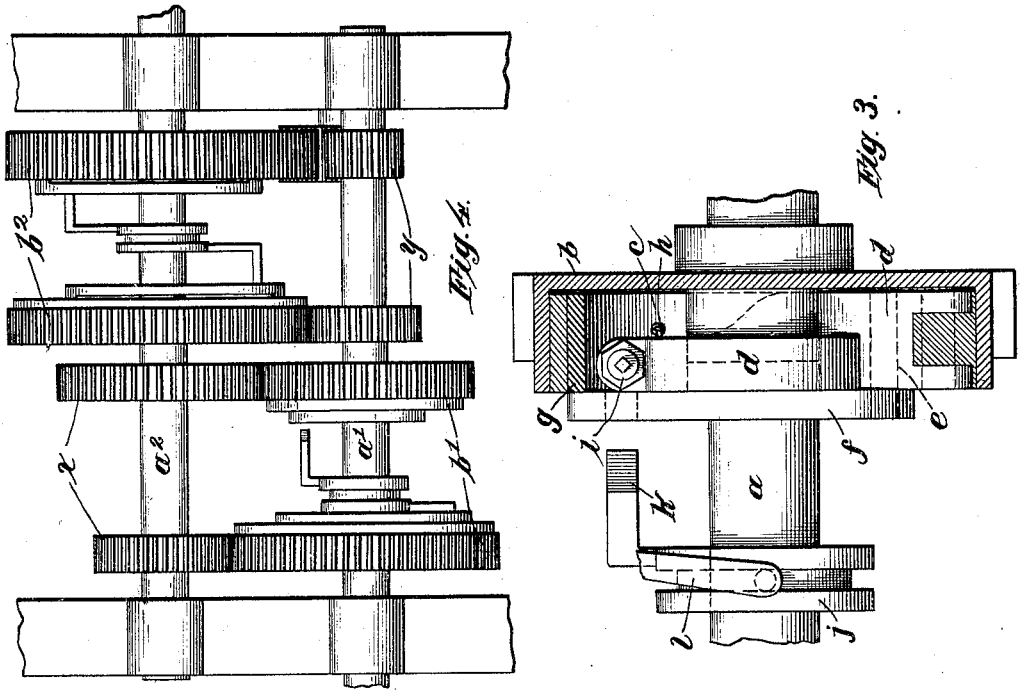
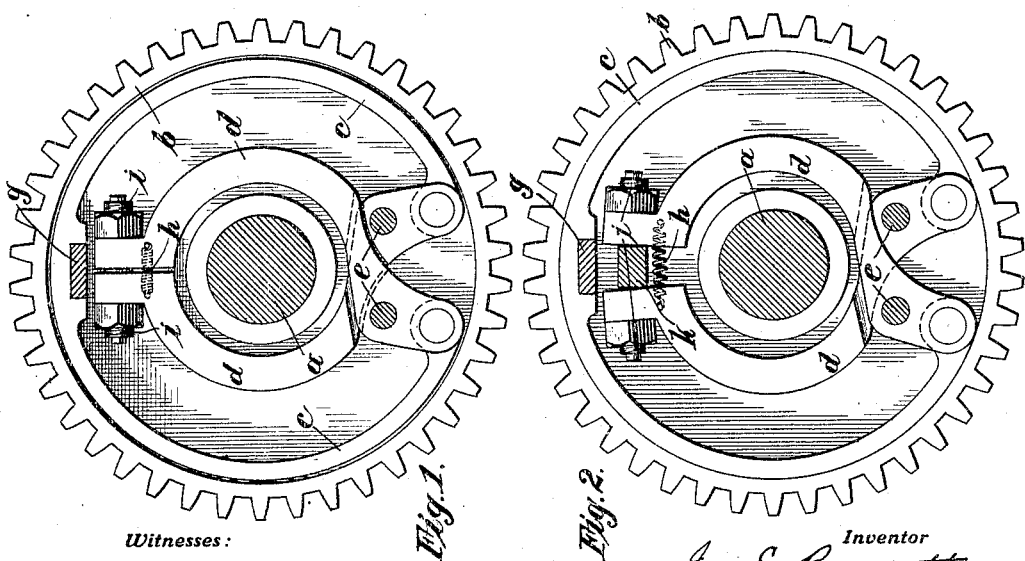
Witnesses:
Inventor
Ira S. Barnett
By
his Attorneys.

No. 791,070. Patented May 30, 1905.

UNITED STATES PATENT OFFICE.

IRA SAYRE BARNETT, OF LOUISVILLE, KENTUCKY.

FRICTION-CLUTCH.

SPECIFICATION forming part of Letters Patent No. 791,070, dated May 30, 1905.

Application filed February 18, 1904. Serial No. 194,289.

*To all whom it may concern:*

Be it known that I, IRA SAYRE BARNETT, a citizen of the United States, residing at Louisville, in the county of Jefferson and State of Kentucky, have invented certain new and useful Improvements in Friction-Clutches, of which the following is a specification, reference being had to the accompanying drawings, forming a part thereof, and in which—

Figure 1 is a front view of a gear loose on a shaft with a clutch embodying my invention shown out of operation or disengaged from the gear. Fig. 2 is a similar view showing the clutch in operation or engaged with the gear. Fig. 3 is a central vertical cross-section of the same with parts, including the shaft and also a clutch-throw, shown in elevation. Fig. 4 is a top plan view of power-transmission mechanism, such as used in motor-vehicles, in which clutches of similar construction are used for throwing the different speed-gears into and out of operation.

My improved clutch is of simple, strong, compact construction and positive reliable action. It is well adapted for power-transmission mechanism or for operatively connecting a shaft with a driving or driven element loosely mounted thereon, as in driving mechanism for automobiles, though the invention is of course susceptible of general application.

Referring to the illustrated embodiment in Figs. 1, 2, and 3, $a$ denotes either a driving or driven shaft, and $b$ a power-transmitting element loosely mounted thereon, in this case an externally-toothed gear having an internally-bored rim or flange. Within this gear is an expansible and contractible friction ring or band $c$. This friction-ring has its free ends pivotally connected to the short arms of levers $d$, which are fulcrumed at $e$ to a collar or member $f$, fast on the shaft. Said collar has a lug or projection $g$ fitted in a slot or recess therefor in the medial part of the friction-ring, so that the latter is caused to rotate with the shaft. Said levers $d$ cross each other, curve oppositely around the shaft, and have their free ends drawn together by a spring $h$. Thus the friction-ring is normally kept contracted and out of engagement with, though close within, the rim or flange of the gear. A clutch-throw $j$, splined to the shaft and connected to a suitable operating-lever $l$, has a spreader $k$, consisting of a projection with a wedge-shaped end. On moving the clutch-throw toward the gear its spreader enters between the free ends of the levers $d$, thereby expanding the friction-ring to effect a positive clutch within the rim of the gear. In order to compensate for wear and provide for greater expansion of the friction-ring, if necessary, adjusting-screws $i$ are shown tapped through the free ends of the levers, and these can be screwed so as to project inwardly for engagement by the spreader. Thus by moving the clutch-throw back and forth the gear or element $b$ is rigidly locked with or released from the shaft $a$. The shaft $a$ is usually a driving or driven shaft, according to whether the gear $b$ is in mesh with a driven or driving gear. For example, Fig. 4 represents power-transmission mechanism for a motor-vehicle, in which $a'$ and $a^2$ denote driving and driven shafts or the engine-shaft and transmission-shaft, respectively. Variable-speed gears $b'$, loose on shaft $a'$, are in mesh with gears $x$, fast on shaft $a^2$, and gears $b^2$, loose on shaft $a^2$, are in mesh or geared with gears $y$ on shaft $a'$. Each loose gear is associated with a clutch, and between each pair of clutches is a clutch-throw having opposite spreaders for operating the opposite clutches. Hence the two shafts may be connected through any one of the four gearings by clutching the loose gear thereof with its shaft.

I claim as my invention and desire to secure by Letters Patent of the United States—

1. A friction-clutch comprising, in combination, a shaft, a loose element thereon having an annular flange, an expansible split friction-ring inclosed within said flange, crossed levers rotatable with the shaft having pivotal connections with the ends of said friction-ring, and a slidable device rotatable with the shaft for spreading the free ends of said levers to expand the clutch against the flange.

2. A friction-clutch comprising, in combination, a shaft, a loose element thereon having an annular flange, a split expansible friction-ring within the flange and normally out of frictional engagement therewith, crossed levers fulcrumed on a part fast to the shaft and having short arms pivotally connected to the free ends of said levers and having their free ends spring-held together, and a slidable clutch-throw rotatable with the shaft having a spreader adapted to enter between and separate said free ends of the levers for expanding the friction-ring against said flange.

3. A friction-clutch comprising, in combination, a shaft, a loose element thereon having an annular flange, a split expansible friction-ring inclosed within said flange, a member fast on the shaft, levers encircling the shaft having crossed arms fulcrumed to said member and pivotally connected to the ends of said friction-ring, and a slidable clutch-throw on the shaft having a wedge adapted to enter between and separate the free ends of said levers for expanding the friction-ring against said flange.

4. A friction-clutch comprising, in combination, a shaft, a loose element thereon having an annular flange, a split expansible friction-ring inclosed within said flange, a member fast on the shaft, levers encircling the shaft having crossed arms fulcrumed to said member and pivotally connected to the ends of said friction-ring, the free ends of said levers being spring-held toward each other, and a slidable clutch-throw on the shaft having a wedge adapted to enter between and separate the free ends of said levers for expanding the friction-ring against said flange.

5. A friction-clutch comprising, in combination, a shaft, a loose element thereon having an annular flange, a split expansible friction-ring inclosed within said flange, a member fast on the shaft having an engagement with said ring, levers encircling the shaft having crossed arms fulcrumed to said member and pivotally connected to the ends of said friction-ring, and a slidable clutch-throw on the shaft having a wedge adapted to enter between and separate the free ends of said levers for expanding the friction-ring against said flange.

In testimony whereof I affix my signature in presence of two witnesses.

IRA SAYRE BARNETT.

Witnesses:
ROY McDOUGALL,
MATTIE L. WOODWARD.